United States Patent
Ueda et al.

(10) Patent No.: US 10,913,577 B2
(45) Date of Patent: Feb. 9, 2021

(54) SUSPENDED STORAGE

(71) Applicant: Daifuku Co., Ltd., Osaka (JP)

(72) Inventors: Yuichi Ueda, Shiga (JP); Noriyuki Wada, Shiga (JP); Masashige Iwata, Shiga (JP)

(73) Assignee: Daifuku Co., Ltd., Osaka (JP)

( * ) Notice: Subject to any disclaimer, the term of this patent is extended or adjusted under 35 U.S.C. 154(b) by 76 days.

(21) Appl. No.: 16/115,978

(22) Filed: Aug. 29, 2018

(65) Prior Publication Data

US 2019/0071219 A1 Mar. 7, 2019

(30) Foreign Application Priority Data

Sep. 7, 2017 (JP) ................... 2017-171642

(51) Int. Cl.
| | | |
|---|---|---|
| B65D 33/14 | (2006.01) | |
| B65G 17/20 | (2006.01) | |
| B65G 19/02 | (2006.01) | |
| B65G 47/61 | (2006.01) | |

(52) U.S. Cl.
CPC ............ *B65D 33/14* (2013.01); *B65G 17/20* (2013.01); *B65G 19/025* (2013.01); *B65G 47/61* (2013.01); *B65G 2201/0261* (2013.01)

(58) Field of Classification Search
CPC .. B65D 85/185; B65D 33/14; B65D 33/1658; B65G 17/20; B65G 19/025; B65G 47/38; B65G 47/61; B65G 9/004; B65G 9/002; B65G 2201/0261; B65G 2812/184; B65G 2812/182
USPC .......................................................... 383/22
See application file for complete search history.

(56) References Cited

U.S. PATENT DOCUMENTS

| | | | |
|---|---|---|---|
| 4,817,778 A | 4/1989 | Davidson | |
| 8,672,118 B2 * | 3/2014 | Janzen ................... | B65G 47/61 198/678.1 |
| 2016/0159558 A1 * | 6/2016 | Schneuing ............. | B65G 47/38 206/282 |

(Continued)

FOREIGN PATENT DOCUMENTS

| | | |
|---|---|---|
| CH | 710650 A1 | 7/2016 |
| CN | 86 1 06210 A | 4/1987 |
| DE | 10354419 A1 | 6/2005 |

(Continued)

OTHER PUBLICATIONS

EP 2130968 A1 Translation (Year: 2009).*

(Continued)

*Primary Examiner* — Jes F Pascua
*Assistant Examiner* — Matthew T Theis
(74) *Attorney, Agent, or Firm* — Kusner & Jaffe

(57) ABSTRACT

A bag capable of storing an article, the bag being conveyed while being suspended from a rail. The bag includes: a body that stores the article; a suspending member that suspends the body from the rail; and a reorienting member that reorients the body with respect to the suspending member. The body includes a bag having an internal storage space for the article, and the reorienting member is provided independently of the body, is supported pivotally with respect to the suspending member, has a free end in the body so as to pivot with respect to the suspending member, and pivots with respect to the suspending member so as to reorient the body.

13 Claims, 14 Drawing Sheets

(56) References Cited

U.S. PATENT DOCUMENTS

2017/0088302 A1     3/2017   Auf Der Maur
2017/0369248 A1    12/2017   Fenile

FOREIGN PATENT DOCUMENTS

| DE | 10 2004 018 569 A1 | 11/2005 | |
|----|--------------------|---------|---|
| EP | 2130968 A1 * | 12/2009 | ........... D06F 95/004 |
| EP | 3147240 A1 | 3/2017 | |
| JP | H05-015853 A | 1/1993 | |
| JP | H07-304514 A | 11/1995 | |
| WO | WO 2012/156451 A1 | 11/2012 | |

OTHER PUBLICATIONS

Extended European Search Report issued in connection with European Patent Application No. 18190911.0, dated Jan. 25, 2019.
Office Action issued in corresponding Chinese Patent Application No. 201810977953.1 dated Feb. 25, 2020.
Office Action issued in corresponding Chinese Patent Application No. 201810977953.1 dated Sep. 8, 2020 (English-language Abstract and English-language machine translation provided).
Office Action issued in corresponding Japanese Patent Application No. 2017-171642 dated Nov. 25, 2020 (English-language machine translation provided).

* cited by examiner

F I G. 3B
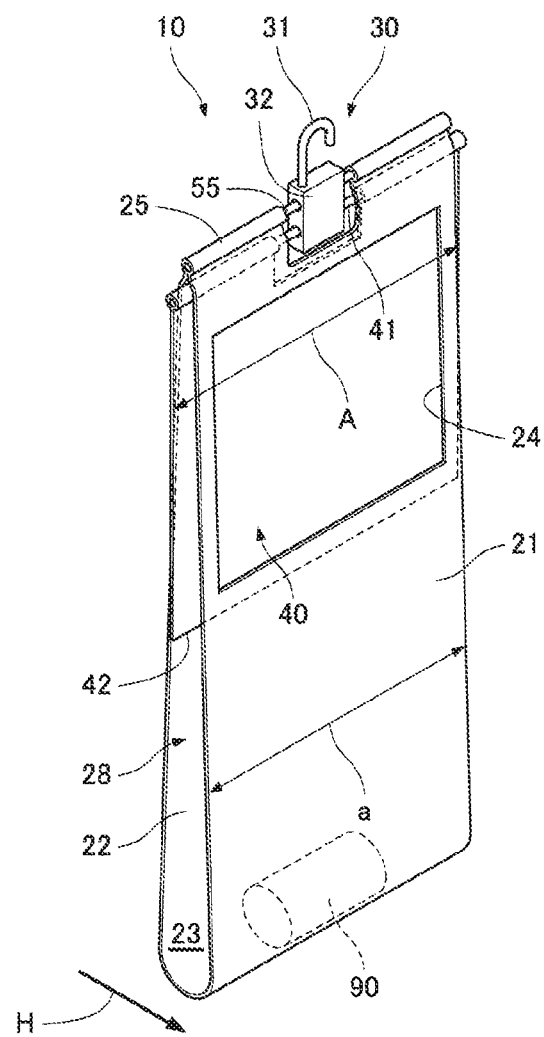

F I G. 5 C
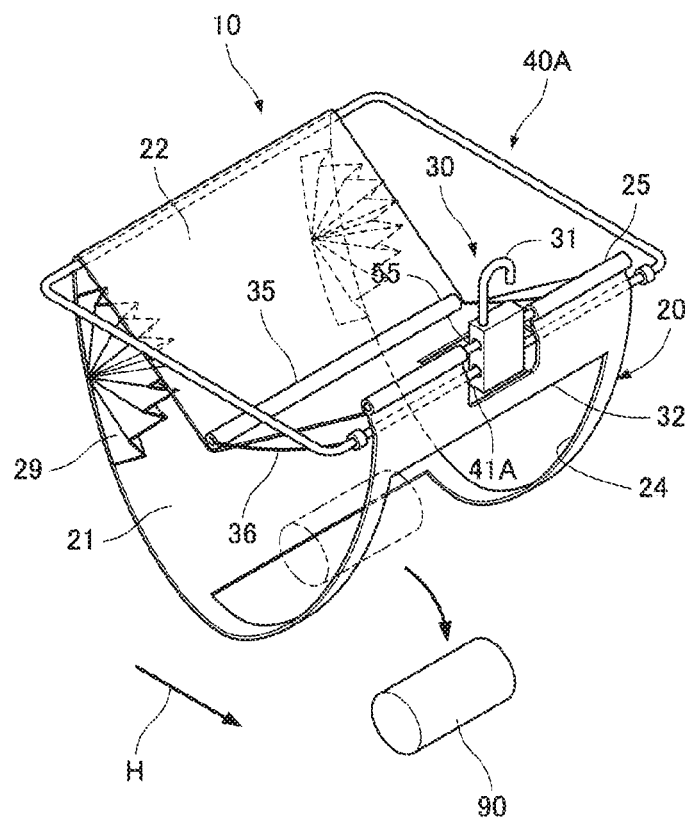

F I G. 6A
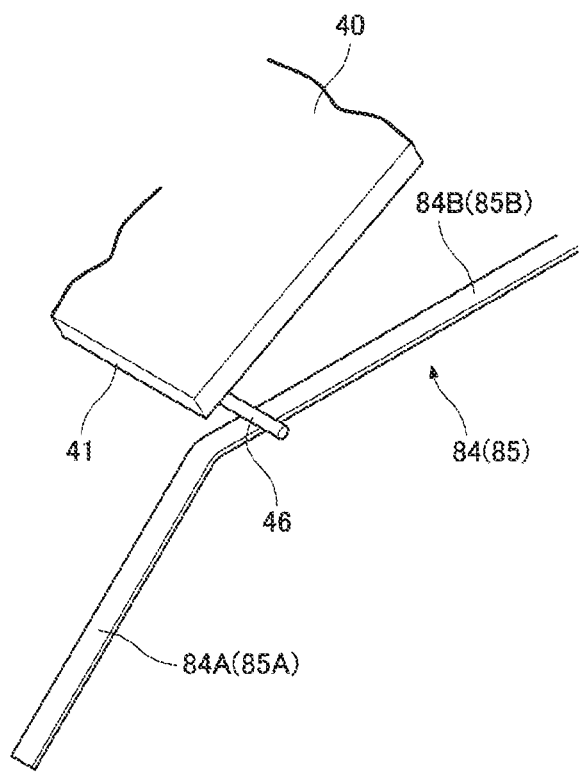

SUSPENDED STORAGE

FIELD OF THE INVENTION

The present invention relates to a suspended storage that is configured so as to store an article and is conveyed while being suspended from a rail.

BACKGROUND OF THE INVENTION

In the related art, conveyor systems for conveying articles such as small goods include a conveyor system for conveying articles by means of a conveyor installed on a floor, e.g., a roller conveyor or a belt conveyor and a conveyor system for conveying articles with suspending devices such as hanger sorters.

The specification of U.S. Patent Application Publication 2016/0159558 describes a suspended storage that is conventionally used in a conveyor system including suspending devices. The suspended storage includes a pocket main unit (storage body) that stores an article, a frame that suspends the pocket main unit, and a hook-shaped suspended element that is suspended from the suspending device and fixes the frame. In the suspended storage described in the specification of U.S. Patent Application Publication 2016/0159558, the pocket main unit is made up of a rear wall part, a front wall part, and a base part connecting the rear wall part and the front wall part. The front wall part has an opening for discharging an article stored in the pocket main unit. In the suspended storage described in the specification of U.S. Patent Application Publication 2016/0159558, the inclination of the frame is changed relative to the suspended element. Thus, the relative positions of the rear wall part and the front wall part are vertically changed and the article in the pocket main unit is discharged from the opening.

In the suspended storage described in the specification of U.S. Patent Application Publication 2016/0159558, however, the rear wall part, the front wall part, and the base part are different members (parts) constituting the pocket main unit (storage body) that stores an article, and the base part needs to be pivoted in order to discharge the article, which is stored in the pocket main unit (storage body), from the opening. Thus, the configuration of the pocket main unit (storage body) may be disadvantageously complicated.

An object of the present invention is to provide a suspended storage that can receive and discharge an article stored in a storage body with a simple configuration.

SUMMARY OF THE INVENTION

A solution to the technical problem of the present invention will be discussed below.

A suspended storage according to the present invention is a suspended storage capable of storing an article, the suspended storage being conveyed while being suspended from a rail, the suspended storage including: a storage body that stores the article; a suspending member that suspends the storage body from the rail; and a reorienting member that reorients the storage body with respect to the suspending member. The storage body includes a bag having an internal storage space for the article, and the reorienting member is provided independently of the storage body, is supported pivotally with respect to the suspending member, has a free end in the storage body so as to pivot with respect to the suspending member, and pivots with respect to the suspending member so as to reorient the storage body.

With this configuration, the reorienting member in the storage body pivots with respect to the suspending member, so that the reorienting member is lifted with respect to the suspending member in the storage body or the reorienting member is suspended from the suspending member in the storage body. Thus, the storage body is lifted by the reorienting member or the storage body is suspended by its own weight. In other words, the reorienting member in the storage body pivots with respect to the suspending member, so that the state of the storage body changes with respect to the suspending member and the storage body is reoriented. If the storage body is composed of a belt-like member (fabric band), the reorienting member pivots with respect to the suspending member, so that the belt-like member suspended from the suspending member is lifted by the reorienting member or the belt-like member lifted with respect to the suspending member is suspended by its own weight. In other words, the reorienting member pivots with respect to the suspending member, so that the state of the belt-like member changes with respect to the suspending member and the storage body composed of the belt-like member is reoriented.

In the suspended storage according to the present invention, in the suspended storage, the bag is formed in a loop shape and has an opening for dropping and discharging the article, and the reorienting member pivots with respect to the suspending member so as to reorient the storage body in a position for conveying the article and a position for discharging the article from the opening.

With this configuration, the reorienting member pivots so as to reorient the storage body, thereby changing the position of the opening to a position where the article can be discharged or a position where dropping (discharge) of the article can be prevented. In other words, the reorienting member pivots so as to reorient the storage body in an orientation for conveying the article and an orientation for discharging the article from the opening. The bag constituting the storage body can be formed by connecting both ends of the belt-like member (fabric band) into a loop shape in the longitudinal direction. If the storage body is composed of the belt-like member (fabric band), an article storage space is formed in a space (clearance) formed between the opposed internal surfaces of the belt-like member when the belt-like member is formed in a loop shape.

A suspended storage of the present invention, in the suspended storage, the storage body is supported independently of the reorienting member by a support member supported by the suspending member.

With this configuration, the storage body is supported by the support member independent of the reorienting member.

A suspended storage of the present invention, in the suspended storage, the storage body includes an anti-drop member that prevents the article from dropping from a loop-shaped opening laterally formed on the bag, the anti-drop member being extensible according to the reorientation of the storage body.

With this configuration, according to the reorientation of the storage body, the opening of the storage body is extended or reduced by the extension and shrink of the anti-drop member. In the storage body including the bag formed by connecting both ends of the belt-like member (fabric band) into a loop shape in the longitudinal direction, the loop-shaped opening is formed laterally in the storage space of the bag (both ends in the width direction of belt-like member).

A suspended storage of the present invention, in the suspended storage, further includes a loading member that vertically applies a load to the storage body when the storage body is reoriented in an orientation for discharging the article from the opening.

With this configuration, the loading member vertically applies a load to the storage body when the storage body is reoriented in an orientation for discharging the article from the opening.

A suspended storage of the present invention, in the suspended storage, the storage body has a first surface suspended from the suspending member and a second surface suspended from the suspending member so as to be opposed to the first surface, the first and second surfaces being formed on an integrated member, the opening is formed in one of the first surface and the second surface, and the reorienting member pivots with respect to the suspending member so as to move the first surface and the second surface and thus moves the opening to a position where discharge of the article stored in the storage body is allowed.

With this configuration, the reorienting member pivots with respect to the suspending member so as to move the opening to a position where discharge of the article stored in the storage body is allowed.

A suspended storage according to the present invention includes, in the suspended storage, the storage body has the opening on the first surface, the pivoting of the reorienting member moves the second surface upward so as to move the opening to a position where dropping of the article into the storage body is allowed, and the pivoting of the reorienting member further moves the second surface upward so as to move the opening to a position where discharge of the article stored in the storage body is allowed.

With this configuration, the second surface of the storage body is moved upward so as to move the opening to a position where dropping of the article into the storage body is allowed and a position where discharge of the article stored in the storage body is allowed.

A suspended storage according to the present invention includes, in the suspended storage, the storage body has the opening on the first surface, the pivoting of the reorienting member moves the first surface upward so as to move the opening to a position where dropping of the article into the storage body is allowed.

With this configuration, the first surface of the storage body is moved upward so as to move the opening to a position where dropping of the article into the storage body is allowed.

According to the suspended storage of the present invention, the reorienting member is pivoted with respect to the suspending member so as to reorient the storage body. Thus, the storage body with the simple configuration can easily and securely receive and discharge the article stored in the storage body.

BRIEF DESCRIPTION OF THE DRAWINGS

FIG. 3B is a perspective view showing the suspended storage being conveyed according to the present invention;

FIG. 5C is a perspective view showing the article being discharged from the suspended storage according to another embodiment of the present invention;

FIG. 6A is a perspective view showing a reorienting member of another embodiment of the suspended storage according to the present invention;

DETAILED DESCRIPTION OF THE INVENTION

A bag 10 acting as a suspended storage according to the present invention will be described below. The present invention is not limited to the bag 10 which will be described below. In the following explanation, a conveying direction H of the bag 10 will be described as the longitudinal direction of the bag 10, whereas a horizontal direction crossing the conveying direction H of the bag 10 will be described as the lateral direction of the bag 10.

Figure 1:
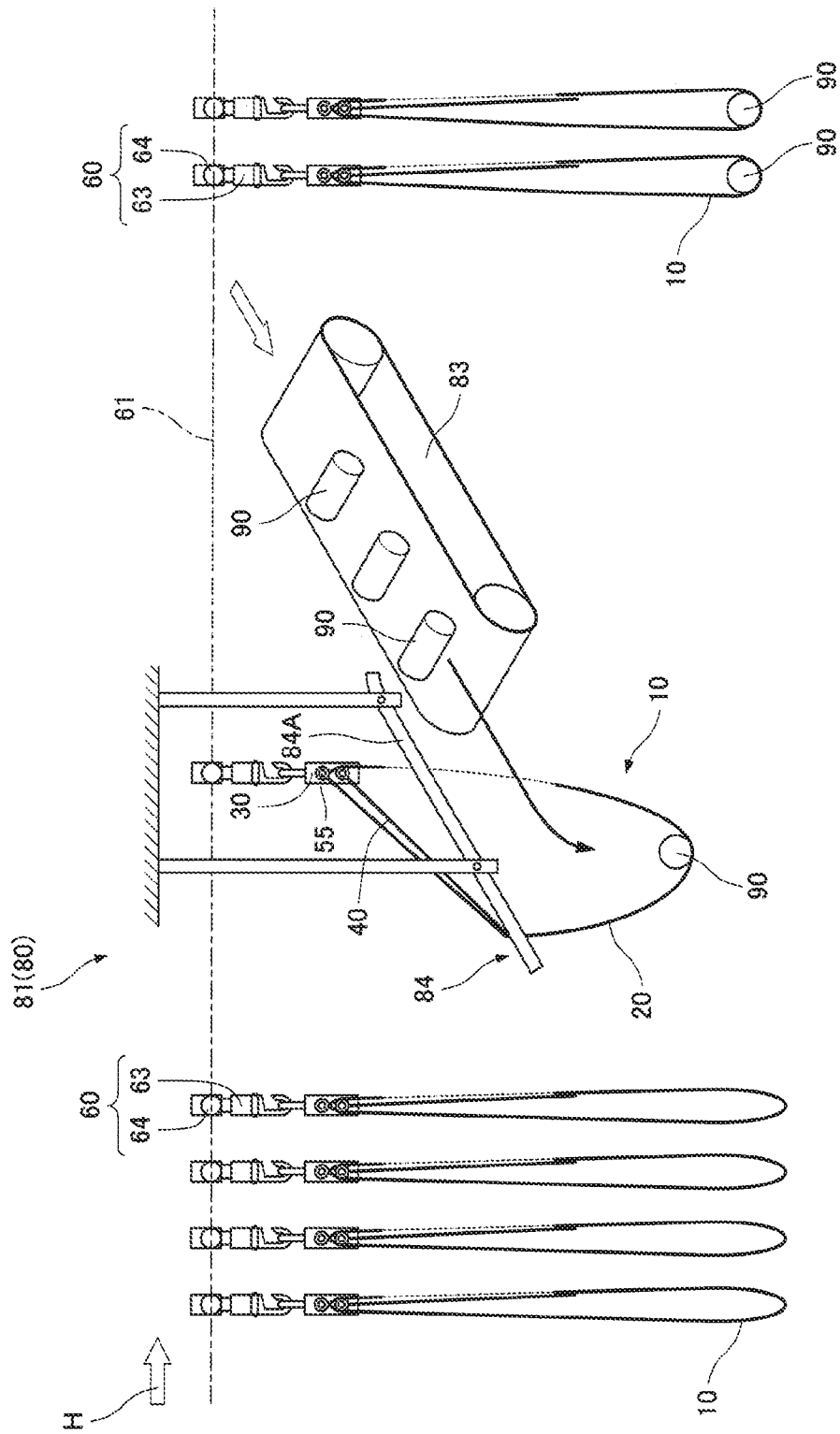
FIG. 1 is a schematic side view showing a drop area for a conveyor system including a suspended storage according to the present invention.
Figure 2:
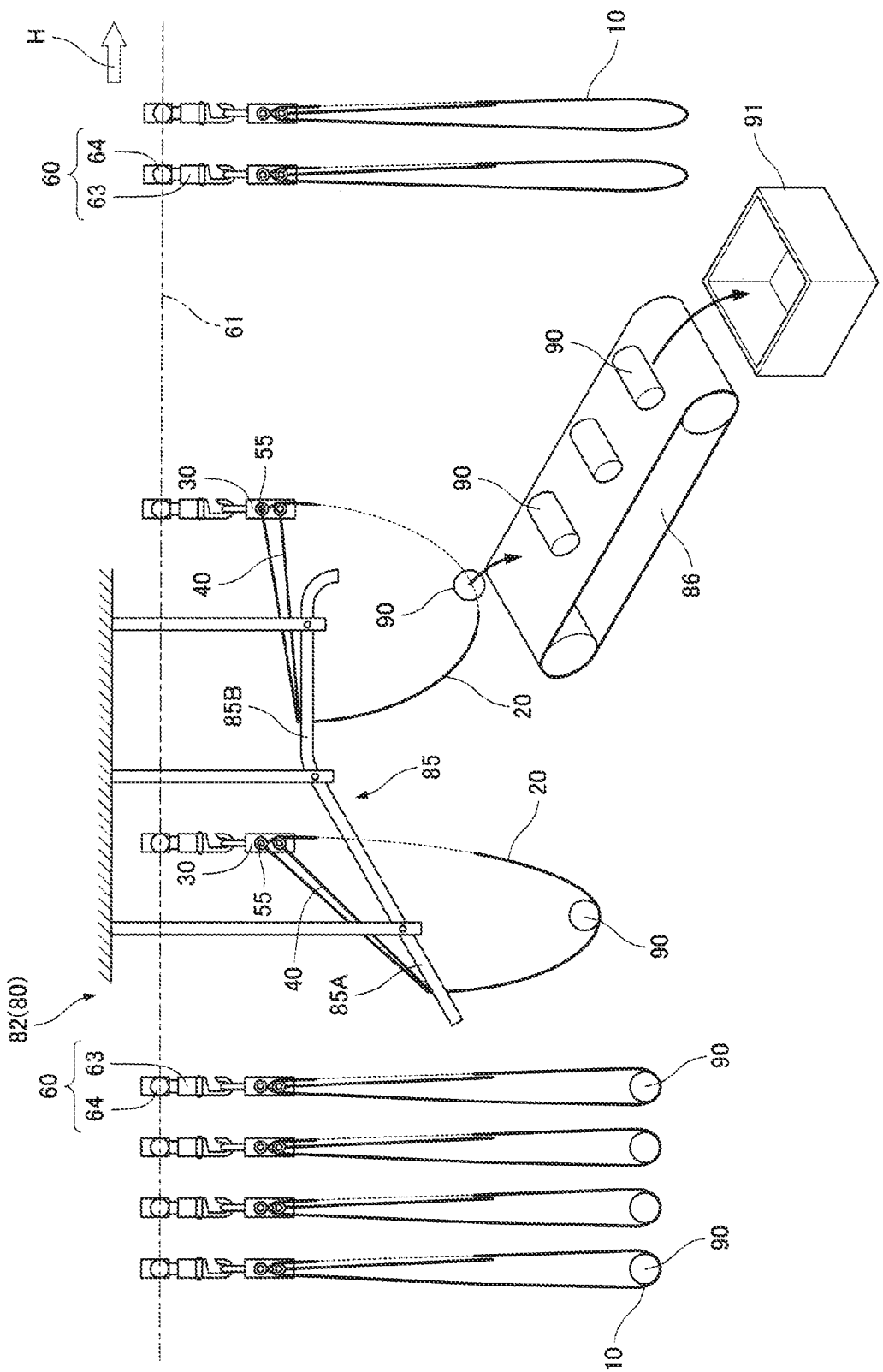
FIG. 2 is a schematic side view showing a discharge area for the conveyor system including the suspended storage according to the present invention.

As shown in FIGS. 1 and 2, the bag 10 is used in a conveyor system 80 where articles 90 ordered (requested) by registered individual users (customers) are collectively delivered to a user-allocated collection container 91. The present invention is not limited to the suspended storage used in the conveyor system 80 which will be described below.

The conveyor system 80 includes a drop area 81 for dropping the article 90 into the bag 10, a discharge area 82 for discharging the article 90 from the bag 10, hanger sorters 60 that convey the suspended bags 10 between the areas of the conveyor system 80, and a rail 61 that is provided on the ceiling above the floor between the areas of the conveyor system 80. In the conveyor system 80, the article 90 ordered by a user is dropped and stored into the bag 10 in the drop area 81. The bag 10 containing the article 90 is conveyed to the discharge area 82 by the hanger sorter 60, so that the article 90 in the bag 10 is collected into the collection container 91.

As shown in FIG. 1, the drop area 81 includes a first conveyor 83 for conveying, to the bags 10, the articles 90 to be stored in the bags 10, and first guide rails 84 for reorienting the bags 10.

The first conveyor 83 is a known conveyor capable of conveying the articles 90 at regular intervals. The first conveyor 83 conveys the articles 90 to a position for dropping the articles 90 into the bags 10. When the articles 90 are conveyed to the dropping position, the first conveyor 83 automatically drops the articles 90 into the bags 10.

The first guide rails 84 are a pair of long members provided along the conveying direction H of the bag 10. The first guide rails 84 are guide rails with an inclined part 84A directed upward from one end to the other end. The first guide rails 84 are spaced such that the pair of long members (rails) can come into contact with both ends of an upper side 41 and both ends of a lower side 42 of a reorienting member 40, which will be discussed later. On the flat inclined part 84A, the first guide rails 84 guide the bag 10 conveyed by the hanger sorter 60. The first guide rails 84 guide the bag 10 on the inclined part 84A, thereby reorienting the bag 10 so as to drop the article 90.

As shown in FIG. 2, the discharge area 82 includes second guide rails 85 for reorienting the bags 10, and a conveyor 86 for receiving the articles 90 discharged from the bags 10.

The second guide rails 85 are a pair of long members provided along the conveying direction H of the bag 10. The second guide rail 85 is a bent guide rail with an inclined part 85A directed upward from one end to the other end and a horizontal part 85B horizontally formed from the inclined part 85A to the other end. The second guide rails 85 are spaced like the first guide rails 84 such that the pair of long members (rails) can come into contact with both ends of the upper side 41 and both ends of the lower side 42 of the reorienting member 40. On the flat inclined part 85A and the flat horizontal part 85B, the second guide rails 85 guide the bag 10 conveyed by the hanger sorter 60. On the inclined part 85A, the second guide rails 85 guide the bag 10 so as to gradually reorient the bag 10 in an orientation for discharging the article 90 from the inside of the bag 10. On the horizontal part 85B, the second guide rails 85 guide the bag 10 so as to reorient the bag 10 into the orientation for discharging the article 90 from the inside of the bag 10.

The conveyor 86 is a known conveyor capable of conveying the articles 90, which are discharged from the bags 10, at regular intervals. The conveyor 86 is disposed below a discharge position for discharging the articles 90 from the bags 10. The conveyor 86 conveys the articles 90, which are received from the bags 10, to the collection container 91 disposed downstream of the conveyor 86.

The hanger sorter 60 is a hanging device that conveys the suspended bags 10. The hanger sorter 60 includes a support 63 that supports the suspended bag 10 and a carrier 64 that is engaged with the rail 61 so as to move the support 63.

As shown in FIGS. 1, 2, and 3A to 3C, the bag 10 includes a body 20 (an example of "storage body") that stores the article 90, a suspending member 30 that suspends the body 20 from the rail 61 (the support 63 of the hanger sorter 60), the reorienting member 40 that reorients the body 20 with respect to the suspending member 30, and a member 55 (an example of "support member") fixed on the suspending member 30 for support of the body 20.

Figure 3A:
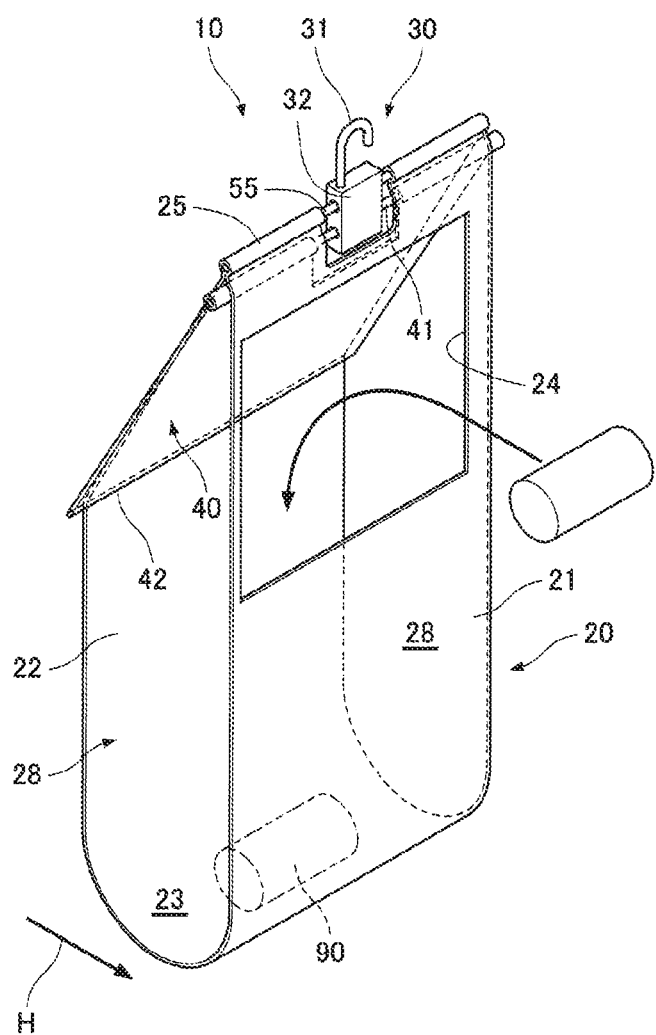
FIG. 3A is a perspective view showing an article being dropped into the suspended storage according to the present invention.
Figure 3C:
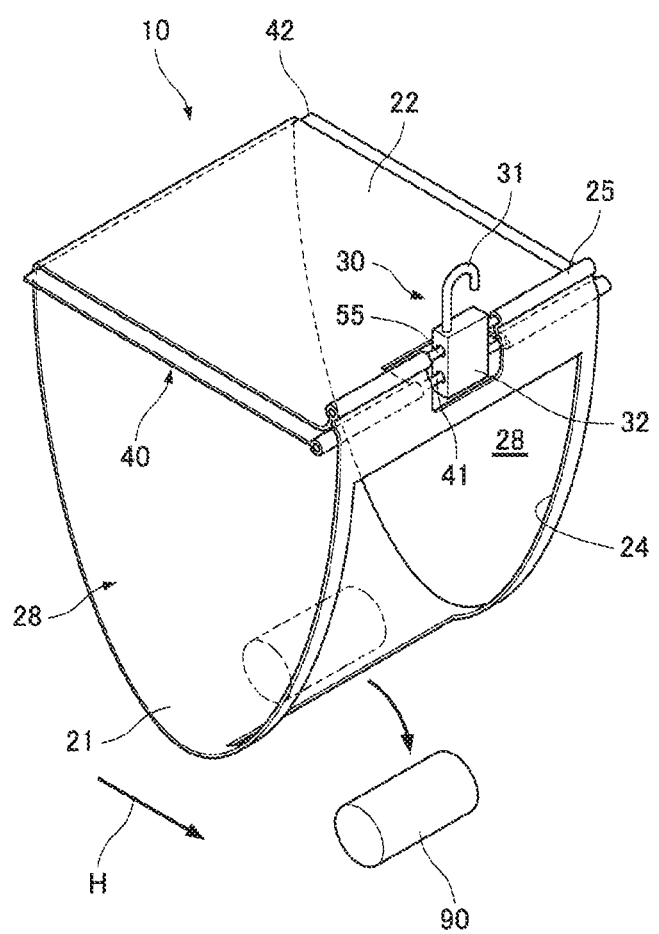
FIG. 3C is a perspective view showing the article being discharged from the suspended storage according to the present invention.

As shown in FIGS. 3A to 3C, the body 20 is composed of a fabric band. The body 20 is formed into a bag (bag-shaped) by connecting both ends of the fabric into a loop shape in the longitudinal direction. The body 20 includes a front surface 21 (an example of "first surface") that is formed so as to be suspended from the support member 55 and a rear surface 22 (an example of "second surface") that is formed so as to be suspended from the support member 55 so as to be opposed to the front surface 21. The body 20 is supported by the support member 55 while being suspended like a letter O in side view. The body 20 has an engaged part 25 that is engaged with the support member 55 on a part (upper part) of the loop-shaped fabric formed into a bag. The body 20 has a storage part 23 (an example of "article storage space") that is an internal space (a space between the front surface 21 and the rear surface 22) formed by the loop-shaped fabric formed into a bag suspended from the support member 55. The article 90 is stored in the lower part of the suspended loop-shaped fabric. The body has an opening 24 for dropping and discharging the article 90 into and from the body 20, in the upper part of the front surface 21.

The suspending member 30 includes a hook 31 engaged with the support 63 of the hanger sorter 60 and a block 32 that supports the reorienting member 40 and the support member 55 while being fixed to the hook 31. The hook 31 can be suspended from the support 63. The hook 31 is engaged with the support 63, suspending the bag 10 from the hanger sorter 60. The block 32 pivotally supports the reorienting member 40. The block 32 supports the support member 55 above the reorienting member 40.

The reorienting member 40 includes a plate capable of lifting the body 20. The reorienting member 40 is provided independently in the body 20 (in a space between the front surface 21 and the rear surface 22 of the body 20). Moreover, the reorienting member 40 is configured such that the lower side 42 vertically pivots about the upper side 41 supported by the block 32 of the suspending member 30. The reorienting member 40 is provided independently of the body 20 such that the upper side 41 on the proximal end is supported by the block 32 of the suspending member 30 and the lower side 42 on the free end is located inside the body 20. The reorienting member 40 is configured such that a length A of the upper side 41 and the lower side 42 is longer than a lateral length a of the body 20. The first guide rails 84 and the second guide rails 85 come into contact with both ends of the upper side 41 and both ends of the lower side 42 of the reorienting member 40. The reorienting member 40 is formed larger than the opening area of the opening 24 formed on the body 20. The reorienting member 40 pivots with respect to the block 32 so as to reorient the body 20. The reorienting member 40 is suspended from the block 32 so as to close the opening 24 of the body 20. In other words, the reorienting member 40 acts as a reorienting member that reorients the body 20 and acts as a lid member that closes the opening 24 of the body 20.

The support member 55 includes a rod-shaped member extended from both sides of the block 32 of the suspending member 30. The support member 55 is engaged with the engaged part 25 of the body 20 so as to support the body 20. The support member 55 is supported by the block 32 above a position where the reorienting member 40 is supported by the block 32. In other words, the body 20 is supported by the support member 55 independently of the reorienting member 40.

The orientations of the bag 10 will be discussed below, during the conveyance of the article 90 in the bag 10, the dropping of the article 90 into the bag 10, and the discharge of the article 90 from the bag 10.

When the article 90 is dropped into the bag 10 (body 20), the reorienting member 40 suspended from the suspending member 30 (block 32) as shown in FIG. 3B is pivotally lifted with respect to the block 32 as shown in FIG. 3A, so that the reorienting member 40 is inclined at a predetermined angle with respect to the block 32. In this case, the predetermined angle is an angle where the lower side 42 of the reorienting member 40 can lift the rear surface 22 of the body 20 so as to extend the interior of the body 20 (a space between the front surface 21 and the rear surface 22) to a degree that the article 90 can be stored in the storage part 23 of the body 20. Specifically, as shown in FIGS. 1 and 3A to 3C, the bag 10 is conveyed to the first guide rails 84, and the right and left ends of the upper side 41 and the right and left ends of the lower side 42 of the reorienting member 40 are conveyed while being guided on (in contact with) the inclined part 84A of the first guide rails 84. Thus, the reorienting member 40 suspended from the block 32 pivots rearward so as to rise with respect to the block 32, so that the opening 24 closed on the body 20 by the reorienting member 40 is opened. At the same time, the rear surface 22 of the body 20 is lifted by the reorienting member 40 so as to move upward, thereby longitudinally extending a space between the front surface 21 and the rear surface 22 of the body 20.

In this way, the reorienting member 40 is lifted at the predetermined angle with respect to the block 32. This opens the opening 24 formed on the body 20 and extends the space between the front surface 21 and the rear surface 22 of the body 20. In other words, the bag 10 is oriented such that the article 90 is dropped from the opening 24 (the article 90 is dropped into the body 20).

When the article 90 stored in the bag 10 (body 20) is conveyed, the reorienting member 40 inclined at the predetermined angle with respect to the suspending member (block 32) as shown in FIG. 3A is pivotally inclined downward with respect to the block 32 as shown in FIG. 3B, so that the reorienting member 40 is suspended from the block 32. Specifically, as shown in FIGS. 1 and 3A to 3C, the bag 10 is conveyed to a position where the right and left ends of the upper side 41 and the right and left ends of the lower side 42 of the reorienting member 40 are separated from the inclined part 84A of the first guide rails 84, so that the reorienting member 40 inclined at the predetermined angle with respect to the block 32 is suspended downward from the block 32. Thus, the reorienting member 40 pivots forward so as to close the opening 24 of the body 20. In other words, the reorienting member 40 prevents the article 90 from dropping from the opening 24 of the body 20.

Since the reorienting member 40 is suspended from the block 32, the rear surface 22 of the body 20 is suspended downward by the weight of the body 20 so as to reduce a space between the front surface 21 and the rear surface 22 of the body 20.

The reorienting member 40 suspended thus closes the opening 24 of the body 20 and reduces a space between the front surface 21 and the rear surface 22 of the body 20. In other words, the bag 10 is oriented so as to convey the article 90 (store the article 90 in the body 20).

When the article 90 is discharged from the bag 10 (body 20), the reorienting member 40 suspended from the suspending member 30 (block 32) as shown in FIG. 3B is pivotally lifted with respect to the block 32 as shown in FIG. 3C, so that the reorienting member 40 is placed in a horizontal position with respect to the block 32. Specifically, as shown in FIGS. 2 and 3A to 3C, the bag 10 is conveyed to the second guide rails 85, and the right and left ends of the upper side 41 and the right and left ends of the lower side 42 of the reorienting member 40 are conveyed while being guided on (in contact with) the inclined part 85A of the second guide rails 85. Thus, the reorienting member 40 suspended from the block 32 pivots rearward so as to rise with respect to the block 32. Furthermore, the bag 10 is conveyed while the right and left ends of the upper side 41 and the right and left ends of the lower side 42 of the reorienting member 40 are guided on (in contact with) the horizontal part 85B of the second guide rails 85, so that the reorienting member 40 is placed in a horizontal position with respect to the block 32. In other words, the inclination of the reorienting member 40 with respect to the block 32 (the height of the body 20 lifted by the reorienting member 40) is larger than that in the dropping of the article 90 into the bag 10 (body 20).

The reorienting member 40 suspended from the block 32 is lifted with respect to the block 32, so that the rear surface 22 of the body 20 is lifted by the reorienting member 40 so as to move upward and the front surface 21 of the body 20 moves downward. Thus, the opening 24 of the body 20 moves downward. Moreover, the reorienting member 40 placed in a horizontal position with respect to the block 32 moves the opening 24 to the bottom of the bag 10 (a position where the article 90 can be discharged). Hence, the article 90 stored in the storage part 23 of the bag 10 is discharged from the opening 24.

As described above, the reorienting member 40 is lifted to a position where the inclination of the reorienting member 40 with respect to the block 32 is larger than that in the dropping of the article 90 into the bag (body 20), thereby moving the front surface 21 of the body 20 downward so as to move the opening 24 to the bottom of the bag 10. In other words, the bag 10 is oriented such that the article 90 stored in the storage part 23 of the bag 10 is discharged from the opening 24.

As described above, according to the present embodiment, the reorienting member 40 pivots with respect to the block 32 so as to reorient the body 20. Furthermore, the inclination of the reorienting member 40 with respect to the block 32 is changed so as to reorient the body 20 in an orientation for dropping the article 90 from the opening 24, an orientation for conveying the article 90, and an orientation for discharging the article 90 from the opening 24. Thus, the article 90 stored in the bag 10 can be easily and securely received and discharged with a simple configuration.

According to the present embodiment, when the bag is oriented so as to convey the article 90, the reorienting member 40 is suspended with respect to the front surface 21 of the body 20 and closes the opening 24 formed on the front surface 21 of the body 20. This can reliably prevent the article 90 from dropping from the opening 24 during the conveyance of the bag 10.

In the present embodiment, the reorienting member includes a plate-like rigid body but is not limited thereto. The reorienting member 40 may include a frame having no faces as long as the body 20 can be lifted.

Figure 4:
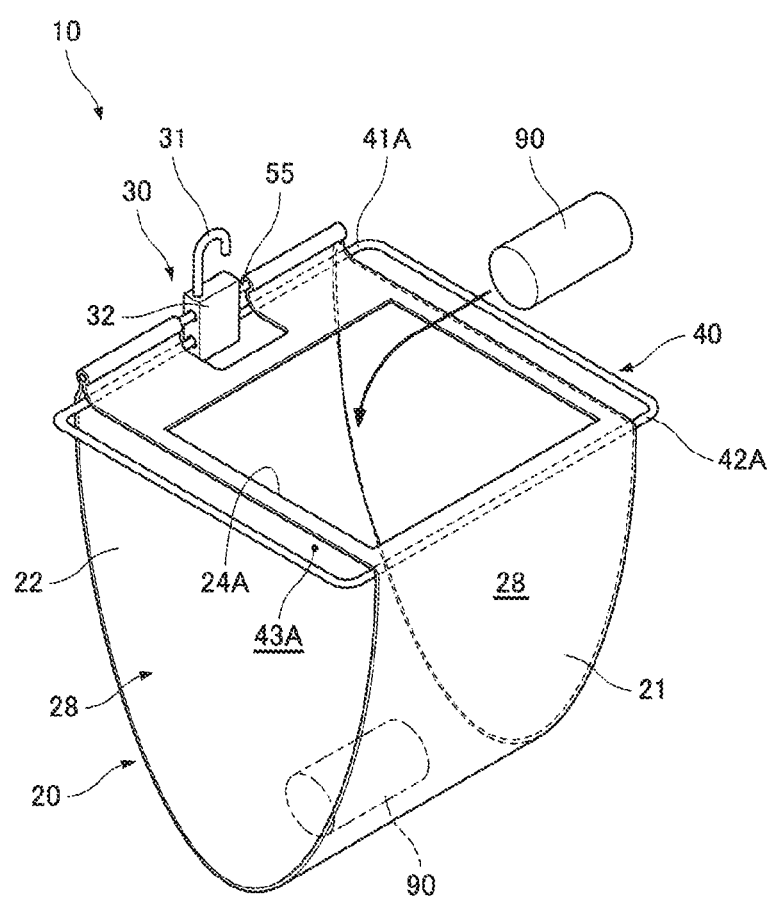
FIG. 4 is a perspective view showing the article being dropped into a suspended storage according to another embodiment of the present invention.

In the present embodiment, the reorienting member 40 pivots to move "rear surface 22" of the body 20 upward, thereby moving the opening 24 of the body 20 to a position where the article 90 can be dropped into the body 20. The present invention is not limited to this configuration. As shown in FIG. 4, a reorienting member 40A may pivot to move "front surface 21" of the body 20 upward such that the opening 24 of the body 20 moves to a position where the article 90 can be dropped into the body 20. In this case, as shown in FIG. 4, the reorienting member 40A includes a rectangular loop frame having no faces. The reorienting member 40A includes a lower frame member 42A that vertically pivots about an upper frame member 41A supported by the block 32 of the suspending member 30. The reorienting member 40A is configured such that both ends of the upper frame member 41A and the both ends of the lower frame member 42A can come into contact with the first guide rails 84 and the second guide rails 85. The reorienting member 40A has an input opening 43A for the article 90, a part surrounded by the loop-shaped frame member. When the reorienting member 40A is placed in a horizontal position with respect to the block 32, the input opening 43A and the opening 24 of the body 20 overlap each other. The reorienting member 40A pivots forward with respect to the block 32 of the suspending member 30 and is lifted into a horizontal position with respect to the block 32. Since the reorienting member 40A is lifted into the horizontal position with respect to the block 32, the front surface 21 of the body 20 is lifted and the opening 24 of the body is opened upward. In other words, the body 20 is oriented such that the article 90 is dropped from the opening 24.

In the present embodiment, the loop-shaped body 20 is supported by, but not exclusively, the support member 55. The body 20 may be supported only by the upper side 41 of the reorienting member 40 without the support member 55.

Figure 5A:
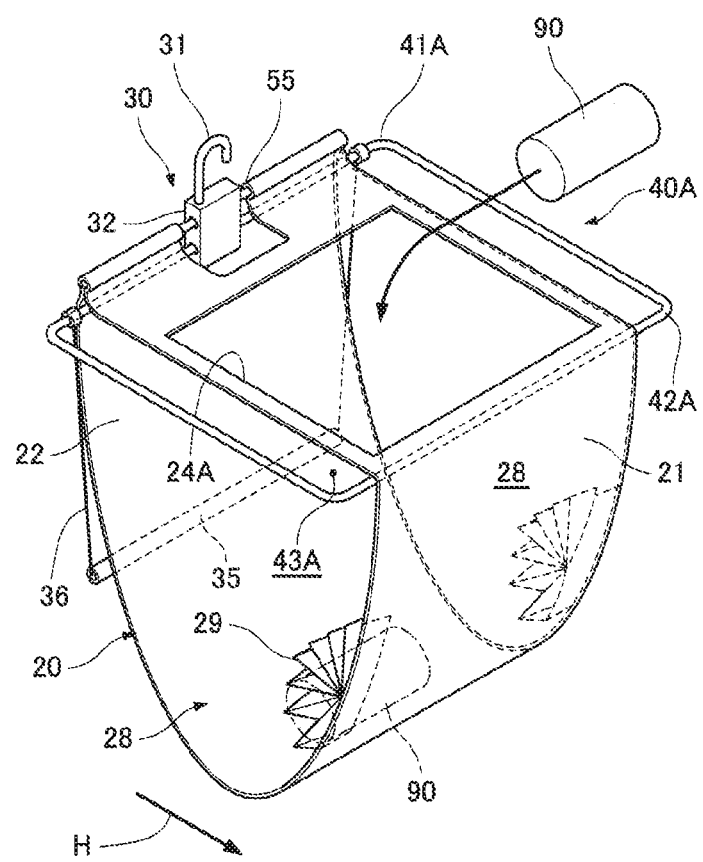
FIG. 5A is a perspective view showing the article being dropped into a suspended storage according to another embodiment of the present invention.
Figure 5B:
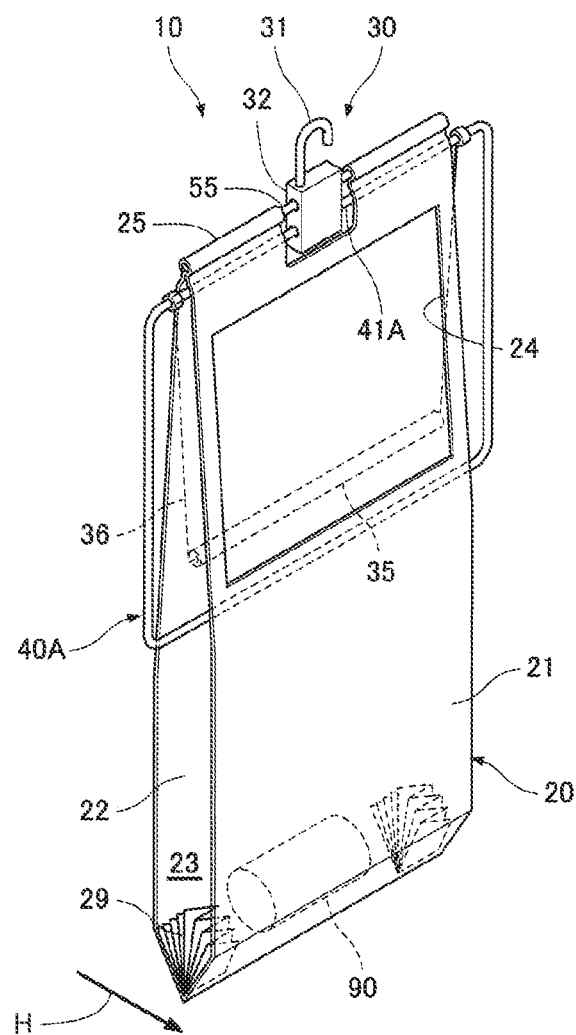
FIG. 5B is a perspective view showing the suspended storage being conveyed according to another embodiment of the present invention.

In the present embodiment, as shown in FIGS. 5A to 5C, gussets 29 (an example of "anti-drop member") may be provided in a loop-shaped opening 28 so as to partially close the opening 28 that is formed around both sides of the storage part 23 of the body 20 (both ends in the width direction of the fabric band constituting the body 20). The gussets 29 prevent the article 90 stored in the storage part 23 from dropping from the opening 28. In this case, the gusset 29 is composed of a member that is extensible according to a change of the orientation of the body 20. The gusset 29 is composed of, for example, a fan-like member or a bellows-like member that is extended by the load of the article 90 discharged from the opening 24 when the body 20 is oriented to discharge the article 90 from the opening 24. As shown in FIG. 5C, the gussets 29 composed of extensible members narrow the sides of the body 20 (opening 28) but do not cause sagging at the center of the body 20, thereby properly inclining the center of the body 20. Hence, the article 90 stored in the body 20 can be efficiently discharged from the opening 24.

In the present embodiment, as shown in FIGS. 5A to 5C, a counter weight 35 (an example of "loading member") may be provided to vertically applying a load to the body 20 when the body 20 is reoriented to discharge the article 90 from the opening 24. The counter weight 35 is composed of a rod-shaped iron pipe. The counter weight 35 is suspended from the reorienting member 40A by cord members 36 attached to both ends of the counter weight 35. In FIGS. 5A to 5C, the counter weight 35 is suspended from the reorienting member 40A by the cord members 36. The present invention is not limited to this configuration. For example, a cylindrical pocket may be provided outside the rear surface 22 of the body 20, allowing the counter weight 35 to be held in the body 20 while being stored in the pocket without being suspended from the reorienting member 40A. Moreover, in FIGS. 5A to 5C, the counter weight 35 is used as a loading member that applies a load to the body 20. The present invention is not limited to this configuration. For example, any member that applies a load to the body 20 with a frame member externally pressing the body 20 is applicable as long as a load can be applied to the body 20.

As shown in FIGS. 5A and 5B, when the body 20 is placed in an orientation for dropping the article 90 from the opening 24 or in an orientation for conveying the article 90, the counter weight 35 is vertically suspended by its own weight from the reorienting member 40A. As shown in FIG. 5C, when the body 20 is placed in an orientation for discharging the article 90 from the opening 24, the counter weight 35 is placed on the rear surface 22 of the body 20. Thus, the rear surface 22 of the body 20 is pressed downward by the load of the counter weight 35 and lifts the front surface 21 (the bottom of the body 20) of the body 20. This sharply inclines the front surface 21 (a surface from the vicinity of the gussets 29 to the opening end of the opening 24) on which the article 90 is placed, facilitating the discharge of the article 90 from the opening 24. Also in the case where the counter weight is replaced with, for example, a frame member that externally presses the body 20, the frame member presses the rear surface 22 of the body 20 downward like the counter weight 35 and lifts the front surface 21 of the body 20 so as to sharply incline the front surface 21 on which the article 90 is placed, thereby facilitating the discharge of the article 90 from the opening 24.

In the present embodiment, the orientations of the body 20 are classified into an orientation for dropping the article 90 from the opening 24 and an orientation for conveying the article 90 but are not limited thereto. The article 90 may be dropped from the opening 24 by an operator when the body 20 is placed in an orientation for conveying the article 90.

In the present embodiment, both ends of the upper side 41 and both ends of the lower side 42 of the reorienting member 40 are brought into contact with the first guide rails 84 and the second guide rails 85 so as to pivot the reorienting member 40 about the block 32 of the suspending member 30. The present invention is not limited to this configuration. For example, the reorienting member 40 may be manually pivoted by an operator without using the first guide rails 84 and the second guide rails 85.

Figure 6B:
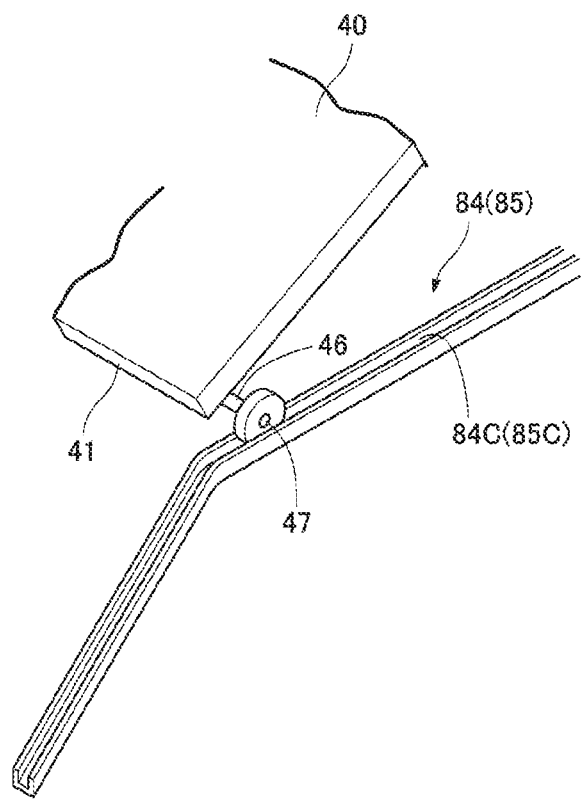
FIG. 6B is a perspective view showing a reorienting member of another embodiment of the suspended storage according to the present invention.

In the present embodiment, both ends of the upper side 41 and both ends of the lower side 42 of the reorienting member 40 are brought into contact with the first guide rails 84 and the second guide rails 85 so as to pivot the reorienting member 40 about the block 32 of the suspending member 30. The present invention is not limited to this configuration. As shown in FIG. 6A, the reorienting member 40 may be pivoted by a contact part 46 laterally protruding from both ends of the upper side 41 and both ends of the lower side 42 of the reorienting member 40 so that the contact part 46 comes into contact with the first guide rails 84 and the second guide rails 85. As shown in FIG. 6B, a roller 47 may be provided so as to be pivotally supported by the contact part 46 that laterally protrudes from both ends of the upper side 41 and both ends of the lower side 42 of the reorienting member 40. The reorienting member 40 may be pivoted by traveling on a groove guide rail 84C (85c) where the roller 47 can travel.

In the present embodiment, the article 90 conveyed to the dropping position by the first conveyor 83 is automatically dropped into the bag 10. The present invention is not limited to this configuration. The article 90 may be dropped into the bag 10 by, for example, an operator or a robot arm.

In the present embodiment, the article 90 discharged from the bag 10 is delivered to the collection container 91 through the conveyor 86. The present invention is not limited to this configuration. For example, the article 90 may be directly delivered into a chute or the collection container 91.

In the present embodiment, the article 90 is dropped and discharged from the opening 24 provided on the body 20. The present invention is not limited to this configuration. The article 90 may be dropped or discharged from the opening 28 of the reoriented body 20 without the opening 24 on the body 20.

In the present embodiment, a plate having a small friction coefficient, e.g. a plastic plate may be disposed in an area where the article 90 slides on the front surface (a surface from the vicinity of the storage part 23 to the opening end of the opening 24 on the front surface 21) when the bag 10 is oriented to discharge, from the opening 24, the article 90 stored in the storage part 23 of the bag 10. This facilitates sliding of the article 90 in the area and discharge of the article 90 from the opening 24.

In the present embodiment, the body 20 is bag-shaped into a loop by connecting both ends of the fabric band in the longitudinal direction. The present invention is not limited to this configuration. Like a bag 10A (an example of "suspended storage") according to another embodiment, a bag may be formed by suspending a fabric band substantially into a U shape in side view from a frame 70. In the description of the bag 10A, the explanation of the same configurations as the bag 10 is omitted.

Figure 7A:
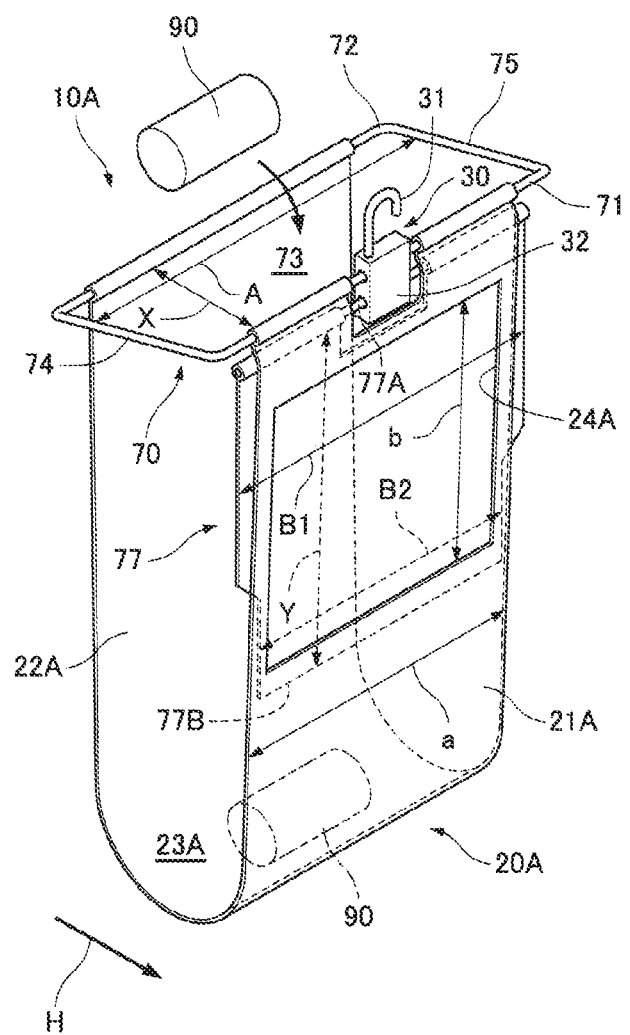
FIG. 7A is a perspective view showing the article being dropped into a suspended storage according to another embodiment of the present invention.
Figure 7B:
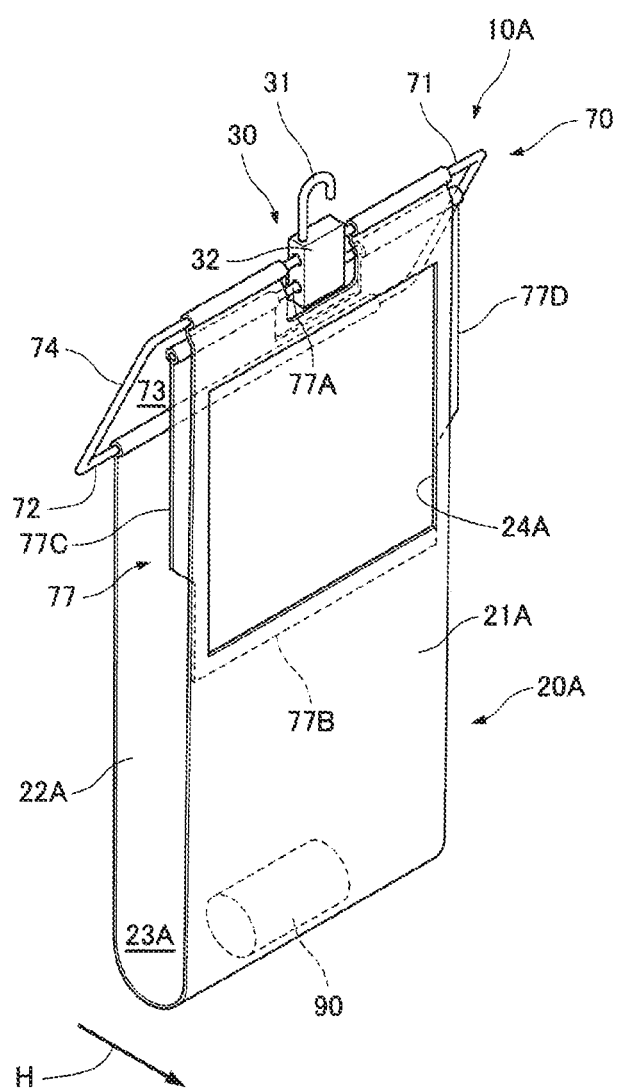
FIG. 7B is a perspective view showing the suspended storage being conveyed according to another embodiment of the present invention.
Figure 7C:
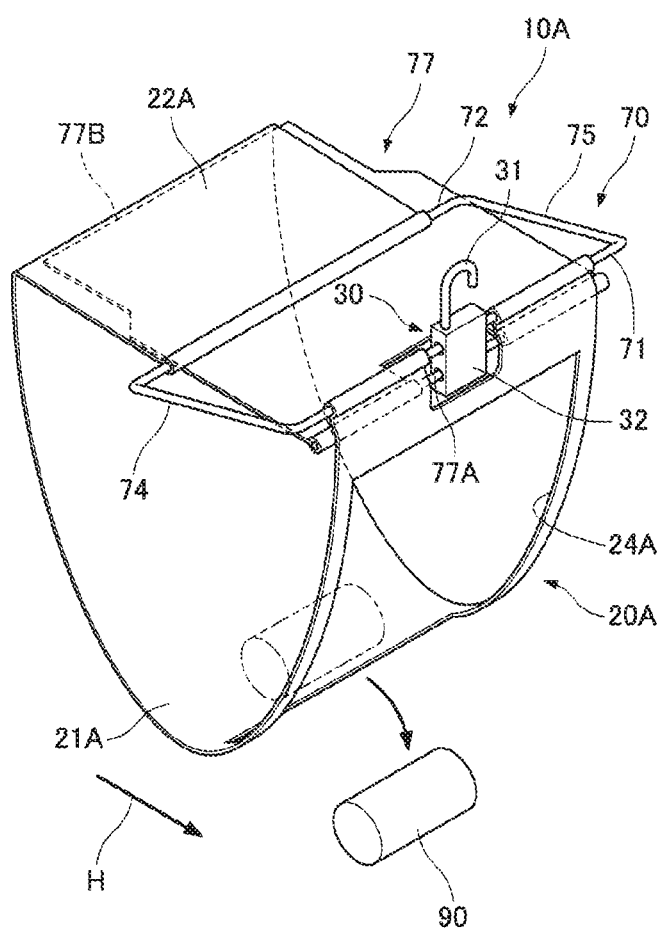
FIG. 7C is a perspective view showing the article being discharged from the suspended storage according to another embodiment of the present invention.

As shown in FIGS. 7A to 7C, the bag 10A includes a body 20A (an example of "storage body") that stores the article 90, a suspending member 30 that suspends the body 20A from the rail 61 (the support 63 of the hanger sorter 60), a frame 70 that supports the body 20A, and a flap 77 (an example of "reorienting member") that reorients the body 20A with respect to the suspending member 30.

The body 20A includes a front surface 21A (an example of "first surface") that is formed so as to be suspended from the front side of the frame 70 and a rear surface 22A (an example of "second surface") that is formed so as to be suspended from the rear side of the frame 70 so as to be opposed to the front surface 21. The body 20A is composed of a fabric band. Specifically, the body 20A is formed by a combination of the front surface 21A and the rear surface 22A. Both ends of the body 20A in the longitudinal direction are attached to the frame 70, so that the body 20A is supported by the frame 70 while being suspended like a letter U in side view.

The body 20A has a storage part 23A (an article storage part in the storage body) that is an interior (a space between the front surface 21A and the rear surface 22A) of a piece of fabric suspended from the frame 70. The article 90 is stored in the lower part of the suspended fabric. The body 20A has a discharge opening 24A for discharging the article 90 stored in the storage part 23A, in the upper part of the front surface 21A.

The block 32 of the suspending member 30 pivotally supports the front side of the frame 70. The block 32 pivotally supports the flap 77 below the frame 70.

The frame 70 includes a rectangular loop frame having no faces. The frame 70 includes a lower frame member 72 that vertically pivots about an upper frame member 71 supported by the block 32 of the suspending member 30. The frame 70 has the upper frame member 71 supporting the end of the front surface 21A of the body 20A and the lower frame member 72 supporting the end of the rear surface 22A of the body 20A. The frame 70 is configured such that a length A of the upper frame member 71 and the lower frame member 72 is longer than a lateral length a of the body 20A. The frame 70 is configured such that the guide rail of the drop area 81 comes into contact with both ends of the upper frame member 71 and both ends of the lower frame member 72. The frame 70 has an input opening 73 for dropping the article 90 into the body 20A, a part surrounded by the loop-shaped frame member.

The flap 77 is provided in the body 20A (in a space between the front surface 21A and the rear surface 22A). The flap 77 includes a plate-like rigid body capable of lifting the body 20A. The flap 77 has an upper end 77A on the proximal end. The upper end 77A is supported by the block 32 of the suspending member 30. The flap 77 is provided independently of the body 20 such that a lower end 77B on the free end is located in the body 20A. The flap 77 is configured such that a length B1 of the upper end 77A is longer than the lateral length a of the body 20A and is shorter than a length A of the upper frame member 71 and the lower frame member 72 of the frame 70. The flap 77 is configured such that a length B2 of the lower end 77B is shorter than the length B1 of the upper end 77A and the lateral length a of the body 20A. The flap 77 is configured such that a length Y of a left end 77C and a length Y of a right end 77D are longer than an opening length b of the discharge opening 24A of the body 20A, a length X of a left frame member 74 of the frame 70, and a length X of a right frame member 75. The flap 77 is configured such that the center of the left end 77C and the center of the right end 77D are bendable. The flap 77 is bent from the lower end 77B so as to keep a constant clearance in the body 20A (between the front surface 21A and the rear surface 22A).

The orientations of the bag 10A will be discussed below, during the conveyance of the article 90 in the bag 10A, the dropping of the article 90 into the bag 10A, and the discharge of the article 90 from the bag 10A.

When the article 90 is dropped into the bag 10A (body 20A), the frame 70 suspended from the suspending member 30 (block 32) as shown in FIG. 7B is pivotally lifted with respect to the block 32 as shown in FIG. 7A, so that the frame 70 is placed in a horizontal position with respect to the block 32. Specifically, the bag 10A is conveyed while the right and left ends of the upper frame member 71 and the right and left ends of the lower frame member 72 of the frame 70 are guided on (in contact with) the guide rails of the drop area 81, so that the frame 70 suspended from the block 32 is lifted and is placed in a horizontal position with respect to the block 32. Thus, the input opening 73 formed on the frame 70 is opened on the body 20.

Since the frame 70 is lifted with respect to the block 32, the rear surface 22A of the body 20A is lifted and moved upward by the frame 70. The frame 70 is placed in the horizontal position with respect to the block 32, thereby longitudinally extending a space between the front surface 21A and the rear surface 22A of the body 20A. At this point, the flap 77 closes the discharge opening 24A of the body 20A while being suspended from the block 32 without pivoting.

In this way, when the article 90 is dropped into the bag 10A (body 20A), the frame 70 supporting the body 20A acts as a reorienting member that reorients the body 20A and the flap 77 acts as a lid member that closes the discharge opening 24A of the body 20A.

When the article 90 stored in the bag 10A (body 20A) is conveyed, the frame 70 placed in a horizontal position with respect to the suspending member 30 (block 32) as shown in FIG. 7A is pivotally inclined downward with respect to the block 32 as shown in FIG. 7B, so that the frame 70 is suspended from the block 32. Specifically, the bag 10A is conveyed to a position where the right and left ends of the upper frame member 71 and the right and left ends of the lower frame member 72 of the frame 70 are separated from the guide rails of the drop area 81, so that the frame 70 placed in a horizontal position with respect to the block 32 is suspended from the block 32. Thus, the input opening 73 formed on the frame 70 is closed on the body 20A.

Since the frame 70 is suspended from the block 32, the rear surface 22A of the body 20A is suspended by the weight of the body 20A so as to reduce a space between the front surface 21A and the rear surface 22A of the body 20A. At this point, the flap 77 closes the discharge opening 24A of the body 20A while being suspended from the block 32 without pivoting.

When the article 90 is discharged from the bag 10A (body 20A), the flap 77 suspended from the suspending member 30

(block 32) as shown in FIG. 7B is pivotally lifted with respect to the block 32 as shown in FIG. 7C, so that the flap 77 is placed in a horizontal position with respect to the block 32. Specifically, the bag 10A is conveyed while the left end 77C and the right end of the flap 77 are guided on (in contact with) the guide rails of the discharge area 82, so that the flap 77 suspended from the block 32 is lifted into a horizontal position with respect to the block 32. The flap 77 is lifted with respect to the block 32, so that the frame 70 is lifted by the flap 77 into a horizontal position with respect to the block 32.

The flap 77 lifted with respect to the block 32 moves the rear surface 22A of the body 20A upward and lifts the front surface 21A of the body 20A. Hence, the opening of the discharge opening 24A of the body 20A is directed downward, allowing the article 90 stored in the storage part 23A of the bag 10A to be discharged from the discharge opening 24A.

In this way, when the article 90 is discharged from the bag 10A (body 20A), the flap 77 acting as a lid member that closes the discharge opening 24A of the body 20A acts as a reorienting member that reorients the body 20A.

What is claimed is:

1. A suspended storage capable of storing an article, the suspended storage being conveyed while being suspended from a rail, the suspended storage comprising:
   a bag, comprising:
      a storage body defining an internal storage space for storage of the article;
      a suspending member that suspends the storage body from the rail; and
      a reorienting member that reorients the storage body with respect to the suspending member; and
   a loading member that vertically applies a load to the storage body when the storage body is reoriented in an orientation for discharging the article from the opening,
   wherein the reorienting member is suspended from the suspending member independently of the storage body, is supported pivotally with respect to the suspending member, has a free end in the storage body so as to pivot with respect to the suspending member, and pivots with respect to the suspending member so as to reorient the storage body,
   wherein the storage body is formed in a loop shape and has an opening for dropping and discharging the article, and
   wherein the reorienting member pivots with respect to the suspending member so as to reorient the storage body in an orientation for conveying the article and an orientation for discharging the article from the opening.

2. The suspended storage according to claim 1, wherein the storage body includes an anti-drop member that prevents the article from dropping from a loop-shaped opening laterally formed on the bag, and
   wherein the anti-drop member is extensible according to reorientation of the storage body.

3. A suspended storage capable of storing an article, the suspended storage being conveyed while being suspended from a rail, the suspended storage comprising:
   a bag, comprising:
      a storage body defining an internal storage space for storage of the article;
      a suspending member that suspends the storage body from the rail; and
      a reorienting member that reorients the storage body with respect to the suspending member,
   wherein the reorienting member is suspended from the suspending member independently of the storage body, is supported pivotally with respect to the suspending member, has a free end in the storage body so as to pivot with respect to the suspending member, and pivots with respect to the suspending member so as to reorient the storage body,
   wherein the storage body has a first surface suspended from the suspending member and a second surface suspended from the suspending member so as to be opposed to the first surface, the first and second surfaces being formed on an integrated member,
   wherein an opening for dropping and discharging the article is formed in one of the first surface and the second surface, and
   wherein the reorienting member pivots with respect to the suspending member so as to move the first surface and the second surface and thus moves the opening to a position where discharge of the article stored in the storage body is allowed.

4. The suspended storage according to claim 3, wherein the storage body is supported independently of the reorienting member by a support member supported by the suspending member.

5. The suspended storage according to claim 4, wherein the reorienting member is suspended from the suspending member independent of the support member.

6. The suspended storage according to claim 3, wherein the storage body includes an anti-drop member that prevents the article from dropping from a loop-shaped opening laterally formed on the bag, and
   wherein the anti-drop member is extensible according to reorientation of the storage body.

7. The suspended storage according to claim 3, wherein the storage body has the opening on the first surface,
   wherein the pivoting of the reorienting member moves the second surface upward so as to move the opening to a position where dropping of the article into the storage body is allowed, and
   wherein the pivoting of the reorienting member further moves the second surface upward so as to move the opening to a position where discharge of the article stored in the storage body is allowed.

8. The suspended storage according to claim 3, wherein the storage body has the opening on the first surface, and
   wherein the pivoting of the reorienting member moves the first surface upward so as to move the opening to a position where dropping of the article into the storage body is allowed.

9. The suspended storage according to claim 1, wherein the storage body is supported independently of the reorienting member by a support member supported by the suspending member.

10. The suspended storage according to claim 9, wherein the reorienting member is suspended from the suspending member independent of the support member.

11. A suspended storage capable of storing an article, the suspended storage being conveyed while being suspended from a rail, the suspended storage comprising:
    a bag, comprising:
       a storage body defining an internal storage space for storage of the article;
       a suspending member that suspends the storage body from the rail; and
       a reorienting member that reorients the storage body with respect to the suspending member, wherein the reorienting member is suspended from the suspending member independently of the storage body, is supported pivotally with respect to the suspending member, has a free end in the storage body so as to pivot with respect to the suspending member, and pivots with respect to the suspending member so as to reorient the storage body, wherein the storage body is formed in a loop shape and has an opening for dropping and discharging the article, wherein the reorienting member pivots with respect to the suspending member so as to reorient the storage body in an orientation for conveying the article and an orientation for discharging the article from the opening, wherein the storage body has a first surface suspended from the suspending member and a second surface suspended from the suspending member so as to be opposed to the first surface, the first and second surfaces being formed on an integrated member, wherein an opening for dropping and discharging the article is formed in one of the first surface and the second surface, and wherein the reorienting member pivots with respect to the suspending member so as to move the first surface and the second surface and thus moves the opening to a position where discharge of the article stored in the storage body is allowed.

12. The suspended storage according to claim 11, wherein the storage body has the opening on the first surface, wherein the pivoting of the reorienting member moves the second surface upward so as to move the opening to a position where dropping of the article into the storage body is allowed, and wherein the pivoting of the reorienting member further moves the second surface upward so as to move the opening to a position where discharge of the article stored in the storage body is allowed.

13. The suspended storage according to claim 11, wherein the storage body has the opening on the first surface, and wherein the pivoting of the reorienting member moves the first surface upward so as to move the opening to a position where dropping of the article into the storage body is allowed.

* * * * *